United States Patent [19]
Sato

[11] Patent Number: 5,142,130
[45] Date of Patent: Aug. 25, 1992

[54] BAR CODE READING SYSTEM AND BAR CODE READING APPARATUS WITH START MARGIN DETECTION CIRCUITRY

[75] Inventor: Shinichi Sato, Kawasaki, Japan

[73] Assignee: Fujitsu Limited, Kawasaki, Japan

[21] Appl. No.: 610,277

[22] Filed: Nov. 7, 1990

[30] Foreign Application Priority Data

Nov. 7, 1989 [JP] Japan .................. 1-289261

[51] Int. Cl.$^5$ .............................. G06K 7/10
[52] U.S. Cl. ...................... 235/462; 235/436; 235/463
[58] Field of Search .................. 235/436, 462, 463

[56] References Cited

U.S. PATENT DOCUMENTS

3,986,000  10/1976  McJohnson ............... 235/463
4,667,089   5/1987  Shirakabe et al. .
5,036,183   7/1991  Ouchi et al. .............. 235/462

FOREIGN PATENT DOCUMENTS

2247023  5/1975  France .

OTHER PUBLICATIONS

Patent Abstracts of Japan, vol. 10, No. 237 (P-487)(2293), Aug. 15, 1986 & JP-A-61 68675 (Tokyo Electric Co., Ltd.) Apr. 9, 1986.
Patent Abstracts of Japan, vol. 6, No. 237 (P-157)(1115), Nov. 25, 1982; & JP-A-57 136280 (Fujitsu K.K.), Aug. 23, 1982.

Primary Examiner—David Trafton
Attorney, Agent, or Firm—Staas & Halsey

[57] ABSTRACT

A bar code reading system produces a binary signal from an analog signal containing a bar code signal, and demodulates the binary signal into numerals. The bar code reading system includes an amplitude increase detector for detecting when the amplitude of the analog signal steeply changes, and a sequence controller for controlling an output of a demodulator that demodulates the binary signal into numerals. When the amplitude increase detector provides a detected signal, the sequence controller carries out its controlling task as if the bar code has a normal white margin, even if the white margin produces noise. This system correctly recognizes the start of the bar code irrespective of noise and enables a lower limit level thereof to be lowered.

8 Claims, 12 Drawing Sheets

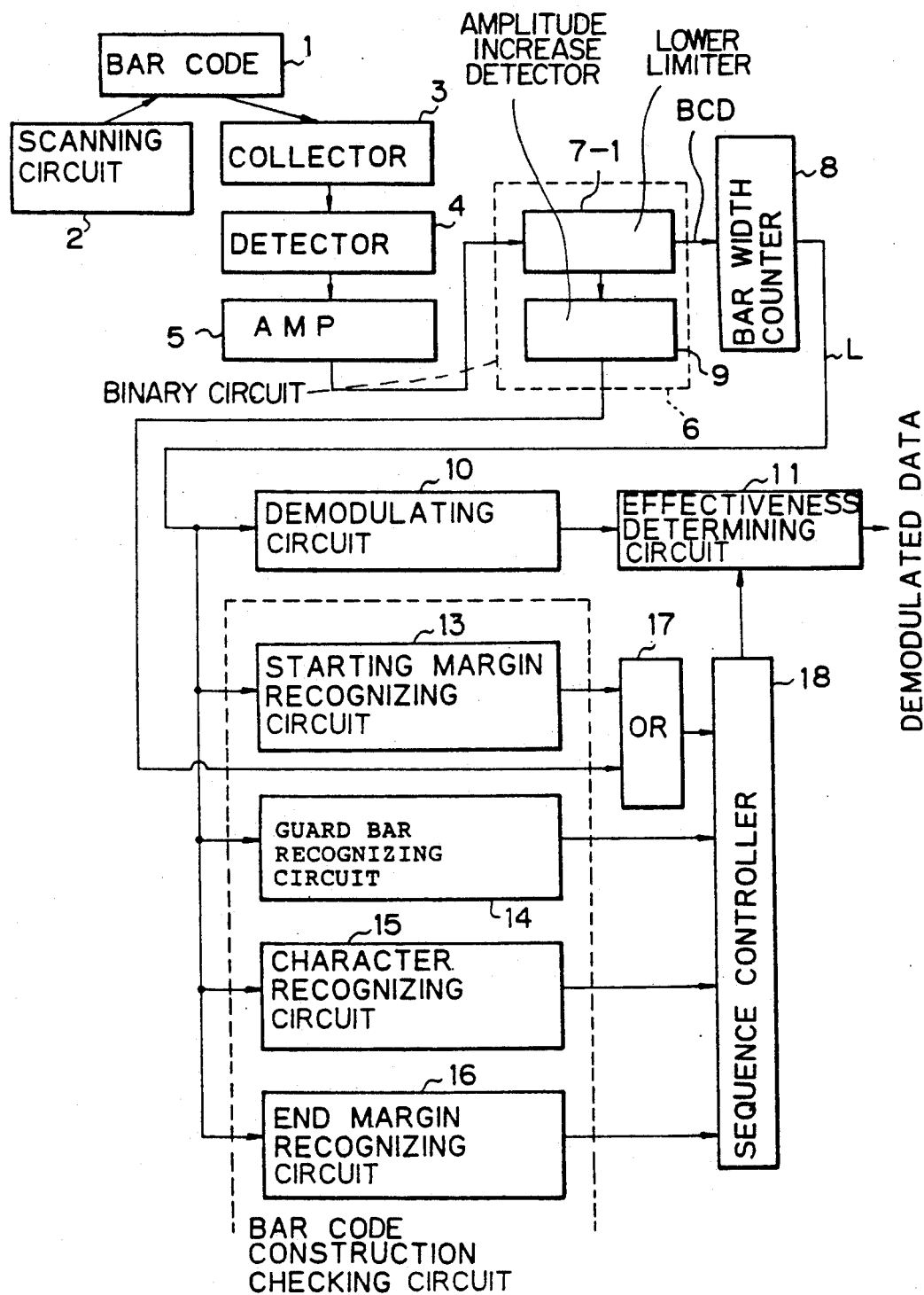

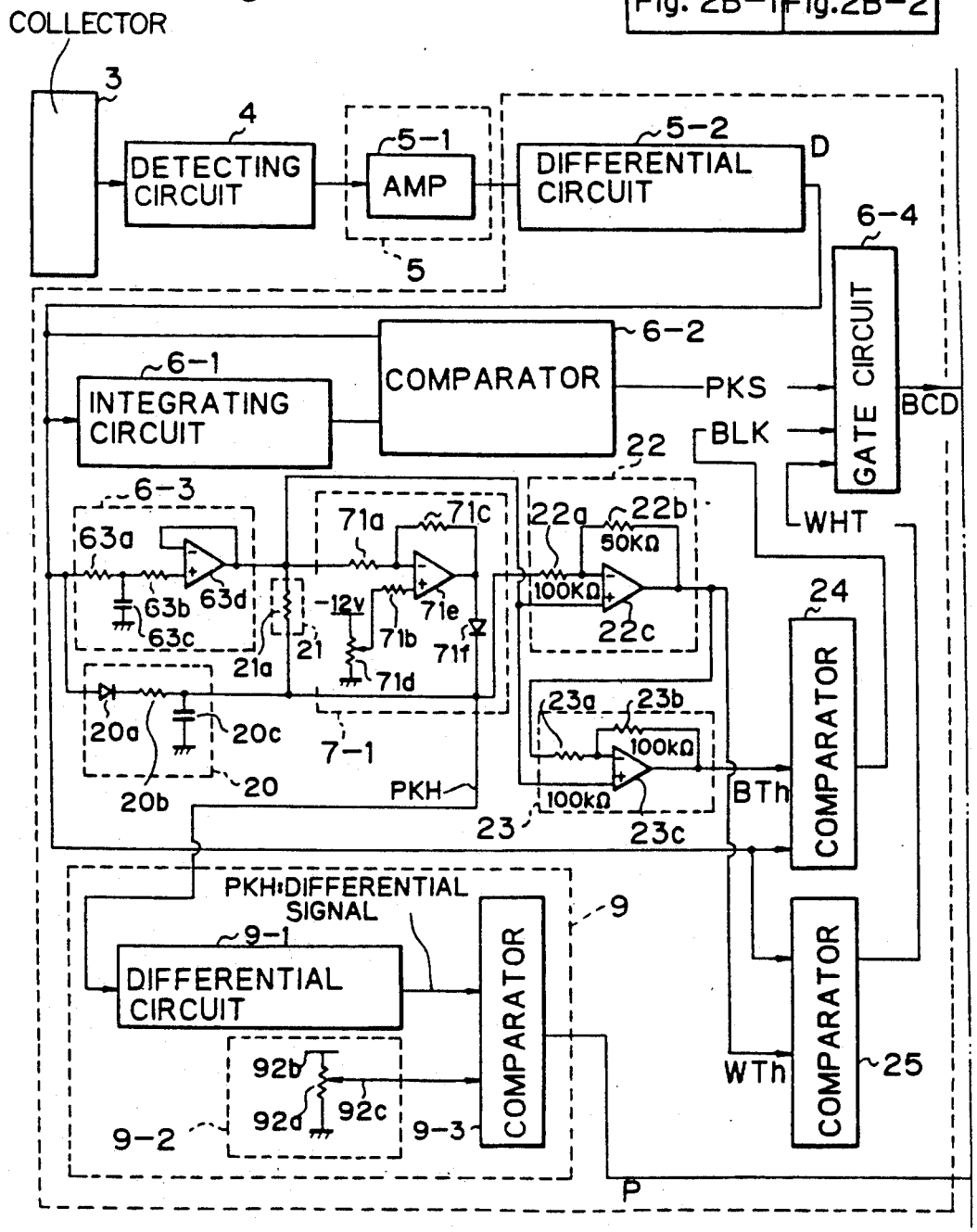

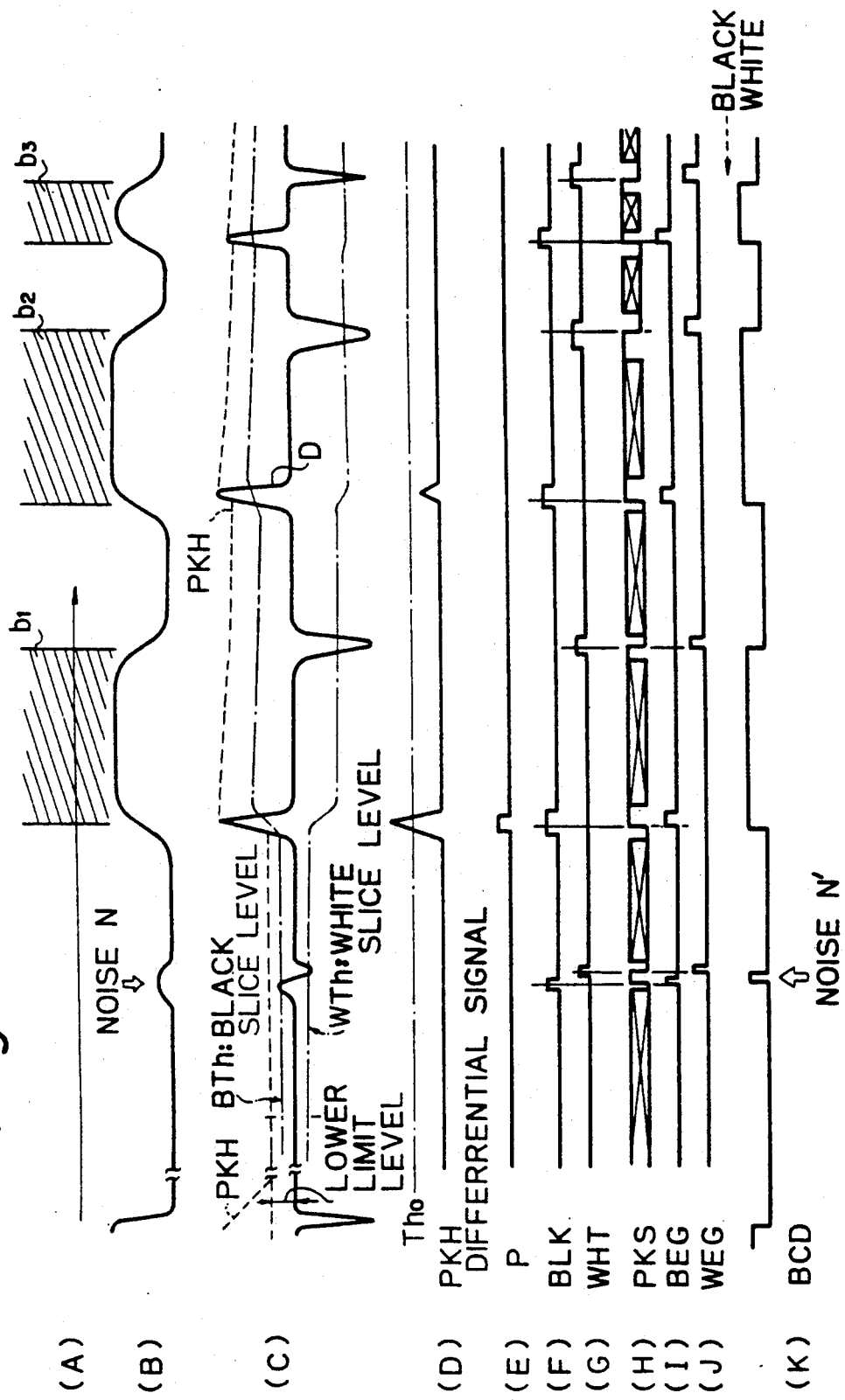

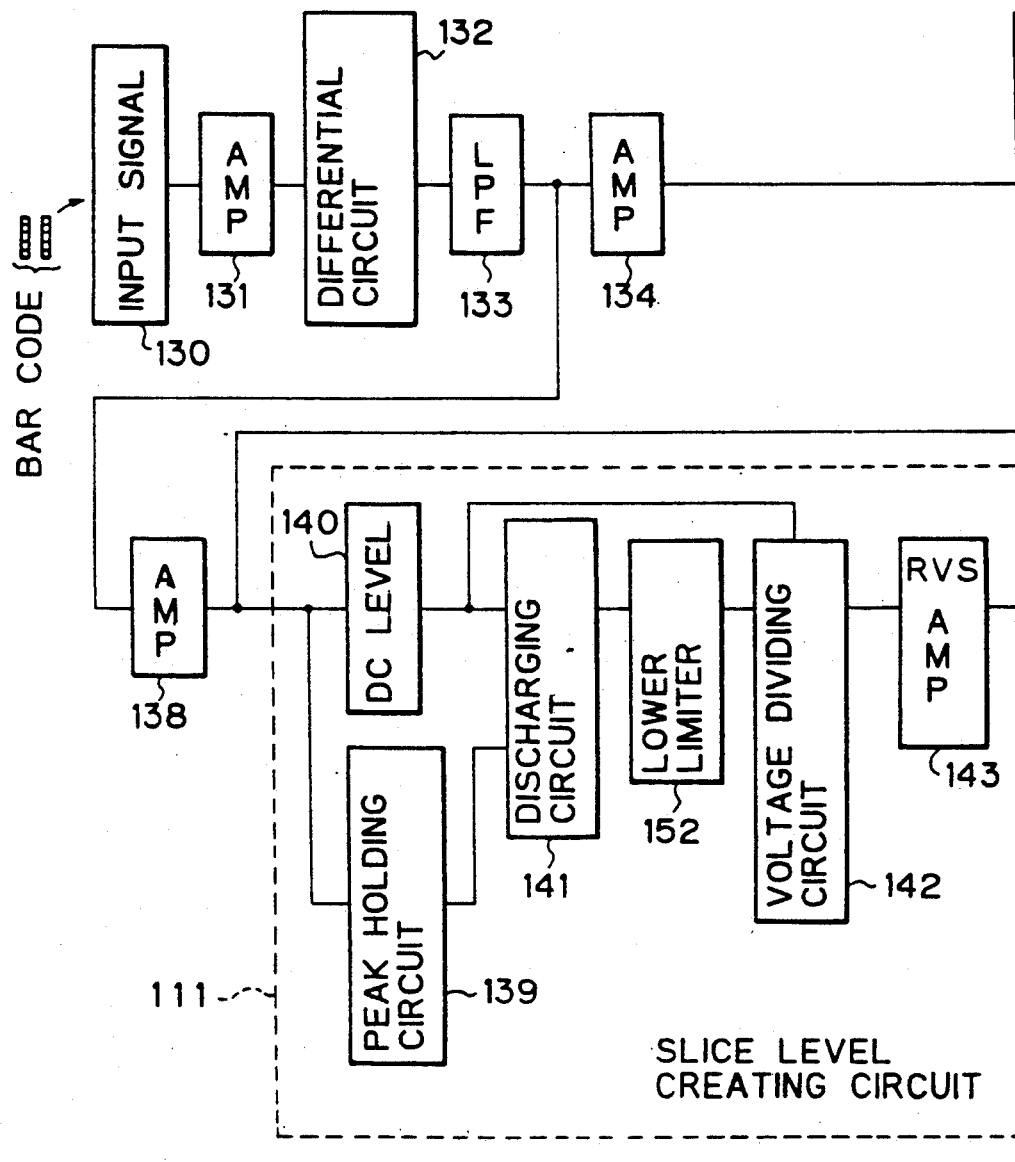

BAR CODE READING SYSTEM AND BAR CODE READING APPARATUS WITH START MARGIN DETECTION CIRCUITRY

BACKGROUND OF THE INVENTION

1. Field of the Invention

The present invention relates to a bar code reading system, and particularly to a bar code reading system and a bar code reading apparatus that can correctly read a bar code even if a white margin of the bar code produces noise.

2. Description of the Related Art

In recent years, bar code readers are widely used with POS terminals as means for merchandise management.

FIG. 5 shows a conventional bar code reader. In the figure, numeral 130 denotes a signal input portion, 131 an amplifier, 132 a differential circuit, 133 a low-pass filter, 134 an amplifier, 135 an integrating circuit, 136 a comparator, 137 a resistor, 138 an amplifier, 139 a peak holding circuit, 140 a DC level circuit, 141 a discharging circuit, 142 a voltage dividing circuit, 143 reversing amplifier, 144 and 145 comparators, 146 and 147 delay circuits, 148 and 149 AND circuits, 150 an inverter, 151 a flip-flop, and 152 a lower limiter.

The integrating circuit 135, comparator 136, and resistor 137 form a comparing portion 110. The peak holding circuit 139, DC level circuit 140, discharging circuit 141, voltage dividing circuit 142, reversing amplifier 143, and lower limiter 152 form a slice level creating circuit 111. The comparators 144 and 145 and delay circuits 146 and 147 form a delay gate signal output portion 112. The AND circuits 148 and 149 form a signal output portion 113.

An operation of the conventional bar code reading system of FIG. 5 will be explained.

The signal input portion 130 receives a bar code read signal. The amplifier 131 amplifies the signal, and the differential circuit 132 differentiates the amplified signal. The low-pass filter 133 removes high-frequency noise from the differentiated signal, and the amplifier 138 amplifies an output of the low-pass filter 133. The peak holding circuit 139 and DC level circuit 140 receive an output of the amplifier 138. The discharging circuit 141 receives outputs of the circuits 139 and 140. An output of the discharging circuit 141 passes through the lower limiter 152, voltage dividing circuit 142, and reversing amplifier 143, thereby providing positive and negative slice levels. The DC level circuit 140 provides an intermediate level of the slice levels.

The comparator 144 receives the positive slice level from the reversing amplifier 143, and the comparator 145 receives the negative slice level from the voltage dividing circuit 142. The delay circuits 146 and 147 adjust outputs of the comparators 144 and 145, respectively, with respect to a delay time existing in the integrating circuit 135, and provide outputs to the AND circuits 148 and 149, respectively.

The low-pass filter 133 also provides its output to the amplifier 134. The amplifier 134 provides an output to the comparator 136 and to the integrating circuit 135. The integrating circuit 135 delays the input signal for a predetermined time and provides the delayed signal to the comparator 136.

According to the outputs of the amplifier 134 and integrating circuit 135, the comparator 136 provides an output to the AND circuit 148 and to the AND circuit 149 through the inverter 150.

The outputs of the AND circuits 148 and 149 are edge signals that indicate the start and the end of a black bar of the bar code, respectively. By monitoring output signals of the flip-flop 151, it is possible to detect the widths and numbers of black and white bars of the bar code and decode the bar code.

An operation of reading black and white bars of a bar code according to the conventional technique will be explained with reference to FIG. 6.

FIG. 6(A) shows a bar code comprising black bars B1 and B2 and a white bar defined between the black bars. FIG. 6(B) shows a signal read from the bar code of FIG. 6(A). The differential circuit 132 of FIG. 5 differentiates the read signal and provides a signal indicated with a continuous line in FIG. 6(C). The integrating circuit 135 of FIG. 5 integrates the differentiated signal and provides a signal indicated with a dotted line in FIG. 6(C). The integrating circuit 135 has a small time constant and provides a delay function.

The comparator 136 of FIG. 5 compares the differentiated signal with the integrated signal, and when the signal from the integrating circuit 135 becomes larger than the other, provides a high (H) level signal as shown in FIG. 6(D).

The comparators 144 and 145 compare the differentiated signal indicated with the continuous line in FIG. 6(C) with a positive slice level Th1 and negative slice level Th2, and provide gate signals shown in FIGS. 6(E) and 6(F), respectively.

The AND circuits 148 and 149 receive the gate signals and the signal of FIG. 6(D) provided by the comparing portion 110, and provide signals shown in FIGS. 6(G) and 6(H), respectively. These signals represent the black and white bars of the bar code as shown in FIG. 6(I), and may set and reset the flip-flop 151 of FIG. 5, thereby providing a signal representing the widths of the black and white bars.

The bar code is sometimes printed on a cylindrical object. In this case, the bar code may provide, when read, weak signals depending on reading angles. To process the weak signals, the bar code reader must have a large dynamic range. Namely, it must have small positive and negative slice levels.

According to standards, the bar code has margins at the start and the end thereof to prevent erroneous reading. Each of the margins comprises a white bar having a predetermined width.

The bar code reader has a detector that detects reflected light from a medium. The bar code reader amplifies the detected light and provides a binary signal. Thereafter, as shown in FIG. 7, a bar code construction checking portion 160 checks a format of the bar code, and a demodulating portion 166 demodulates the bar code into concrete numerals according to a recognition logic.

The bar code construction checking portion 160 comprises a start margin recognizing portion 161, a guard bar recognizing portion 162, a character recognizing portion 163, an end margin recognizing portion 164, etc. The start margin recognizing portion 161 checks to see whether or not a prescribed white margin exists at the left side of the bar code. The guard bar recognizing portion 162 checks to see whether or not prescribed guard bars exist on each side and the center of the bar code. The character recognizing portion 163 checks to see that each character comprises two white bars and two black bars and that there are seven character modules. The end margin recognizing portion 164 checks to see whether or not a prescribed white margin exists at the right side of the bar code.

An amplifying portion 170 of FIG. 7 (corresponding to the amplifier 131, differential circuit 132, low-pass filter 133, etc., of FIG. 5) provides an input signal to a binary circuit 171 (corresponding to the comparing portion 110, slice level creating circuit 111, gate signal output portion 112, signal output portion 113, flip-flop 151, etc., of FIG. 5) A bar width counter 173 measures the widths of white and black bars according to an output of the binary circuit 171, and provides the measured result to the demodulating portion 166 and bar code construction checking portion 160.

The demodulating portion 166 demodulates the output of the bar width counter 173 into characters, i.e., concrete numerals. The bar code construction checking portion 160 checks the bar code. If the bar code is normal, a sequence controller 165 sends an effective signal to an effectiveness determining section 167. In response to the effective signal, the effectiveness determining section 167 passes the numerals decoded by the demodulating portion 166, as demodulated data.

If the read bar code including the margins is not correctly converted into binary data, it is impossible to read the bar code.

A laser bar code reader has a deep reading depth and a large dynamic range for reflected light.

A margin of a bar code is printed white so that it may basically cause no change in the quantity of reflected light. When a laser beam for scanning the bar code is thin and the quantity of reflected light is large, the margin may produce relatively large noise due to very small irregularities on the surface of a sheet where the bar code is printed.

To prevent the margin from providing erroneous binary data due to the noise, the conventional bar code reader mentioned above employs the lower limiter 152 of FIG. 5 and the lower limiter 172 of FIG. 7. These limiters prevent a slice level from dropping below a predetermined value, thereby preventing noise below the predetermined level from providing binary data.

This predetermined level is required not to be too small. This raises a problem that a weak signal generated from a small quantity of reflected light and having a signal level below the predetermined level cannot be converted into binary data. In this case, it is impossible to read the bar code.

SUMMARY OF THE INVENTION

An object of the present invention is to provide a bar code reading system employing high-speed scanning means for reading a bar code formed on the surface of an object that moves in a space at a high speed. The system of the present invention can solve the problems of the conventional bar code reading technique, correctly read a bar code, and convert it into binary data, even if a slicing level is low, even if reflected light is weak, and even if irregularities on the surface of a sheet where the bar code is printed produce noise.

In order to accomplish the object, a bar code reading apparatus according to the present invention comprises a scanning portion, a collector for collecting light reflected from a bar code, a binary circuit for providing binary data according to an analog signal contained in the collected light, a bar width counter for computing the widths of bars of the bar code according to an output of the binary circuit, a demodulating portion for generating predetermined information according to values provided by the bar width counter, a bar code construction checking portion for checking the construction of predetermined parts of the bar code according to the values provided by the bar width counter, and a sequence controller for controlling the bar code construction checking portion, judging, only when the bar code has a predetermined construction, that output data provided by the demodulating portion is effective, and letting the data of the demodulating portion go out. The bar code reading apparatus also includes an amplitude increase detecting means for detecting when the amplitude of the analog signal steeply changes. When the amplitude increase detecting means provides a detected signal, the sequence controller acts as if there were a normal white margin in the bar code, even if at least a start margin of the bar code produce noise.

BRIEF DESCRIPTION OF THE DRAWINGS

FIGS. 2A, 2B-1 and 2B-2 are schematic views showing the essential part of a first embodiment of the present invention;

FIG. 2B is a diagram illustrating the connection of the block diagrams of FIG. 2B-1 and FIG. 2B-2;

FIG. 3 is a chart for explaining an operation of the present invention;

FIG. 4 is a digram illustrating the connection of the block diagrams of FIGS. 4A, 4B and 4C;

FIGS. 5A and 5B are block diagrams of a binary signal output portion according to a prior art;

DESCRIPTION OF THE PREFERRED EMBODIMENTS

A bar code reading system according to the present invention reads at a high speed a bar code printed on an object that is moving in a space at a high speed. The diameter of a laser beam emitted by the bar code reading system is, therefore, thin, and the quantity of reflected light of the laser beam collected by a collector is small. In obtaining binary data from the collected laser beam under these conditions, noise easily occurs.

Under these conditions, it is not preferable to fix a limiter level for providing the binary data because noise frequently occurs with the fixed limiter level. A conventional technique adopts, therefore, a means (the slice level creating circuit 111 of FIG. 5) for changing the limiter level in response to the quantity of input light. This means is, however, not sufficient. If the limiter level is set low for a small quantity of light, for example, for detecting a white bar of a bar code, stains and dirt on the white bar may produce an output that exceeds the limiter level, and such an output may provide erroneous information that a black bar exists.

To deal with this, the present invention utilizes a fact that the detection level of a correct black bar of a bar code is much larger than that of a white bar of the bar code. Stains on the white bar may provide an erroneous black bar detected signal, and a correct black bar following the white bar may provides a detected signal that accompanies a steep increase in the level of the detected signal to exceed a predetermined value. In this case, the present invention judges that there is a black bar at the position where the steep increase in the signal level has occurred and that the signal detected before the steep increase is noise. The present invention then ignores the noise and confirms the continuation of the white bar.

Namely, if there is a steep increase in a detected signal level, the present invention judges that there has been a noise occurring state before the steep increase.

More precisely, in reading start margin, guard bar, characters, guard bar, and end margin of a bar code in this order, a conventional bar code reader sometimes mistakenly recognizes stains and dust on the start margin as part of the guard bar. The present invention, however, judges that an erroneous signal produced by the stains and dust on the start margin is noise and that the start margin is continuous, if detecting a correct guard bar after the erroneous signal, i.e., if detecting a steep increase in a detected signal level after the detection of the erroneous signal. Namely, the present invention detects that the signal that has caused the steep increase in signal level represents the guard bar.

Figure 1:
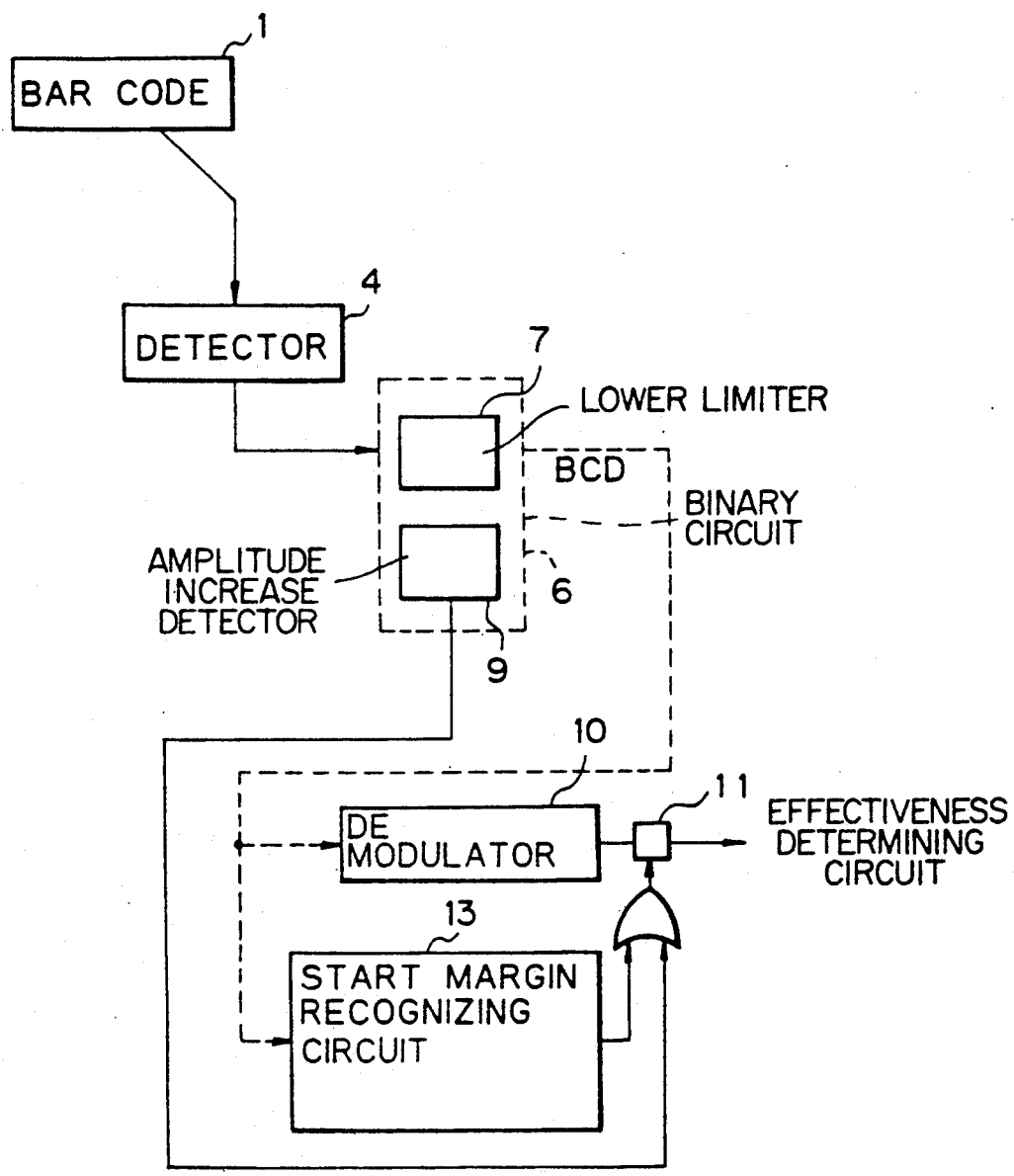
FIG. 1 is a schematic view showing the principle of the present invention.

FIG. 1 shows a basic circuit of an embodiment of the present invention.

In FIG. 1, numeral 1 denotes a bar code to be read, 4 a detector having a photoelectric converter for converting reflected light from the bar code 1 into an electric signal, 6 a binary circuit, 7 a lower limiter, 10 a demodulator, and 13 a start margin recognizing portion. The binary circuit 6 includes an amplitude increase detector 9 for detecting a first black bar after a white margin of the bar code 1.

In FIG. 1, the bar code 1 reflects light when scanned. The detector 4 converts the reflected light into an electric signal, which transfers to the binary circuit 6, lower limiter 7, and amplitude increase detector 9.

If the white margin of the bar code 1 produces a no noise, the binary circuit 6 produces binary signal based on the electric signal, and the demodulator 10 demodulates the binary signal into numerals. At this time, the start margin recognizing portion 13 provides a check of the bar code. If the white margin is normal, the start margin recognizing portion 13 provides a check result. If other parts of the bar code are also normal, an effectiveness determining circuit 11 judges that the numerals decoded by the demodulator 10 are effective, and transfers them to a computer means (not shown).

If the white margin of the bar code 1 produces noise, the width of the white margin will be measured shorter than a prescribed width, so that the start margin recognizing portion 13 may not provide a start margin recognized signal, and the effectiveness determining circuit 11 does not send the numerals decoded by the demodulator 10.

Figure 7:
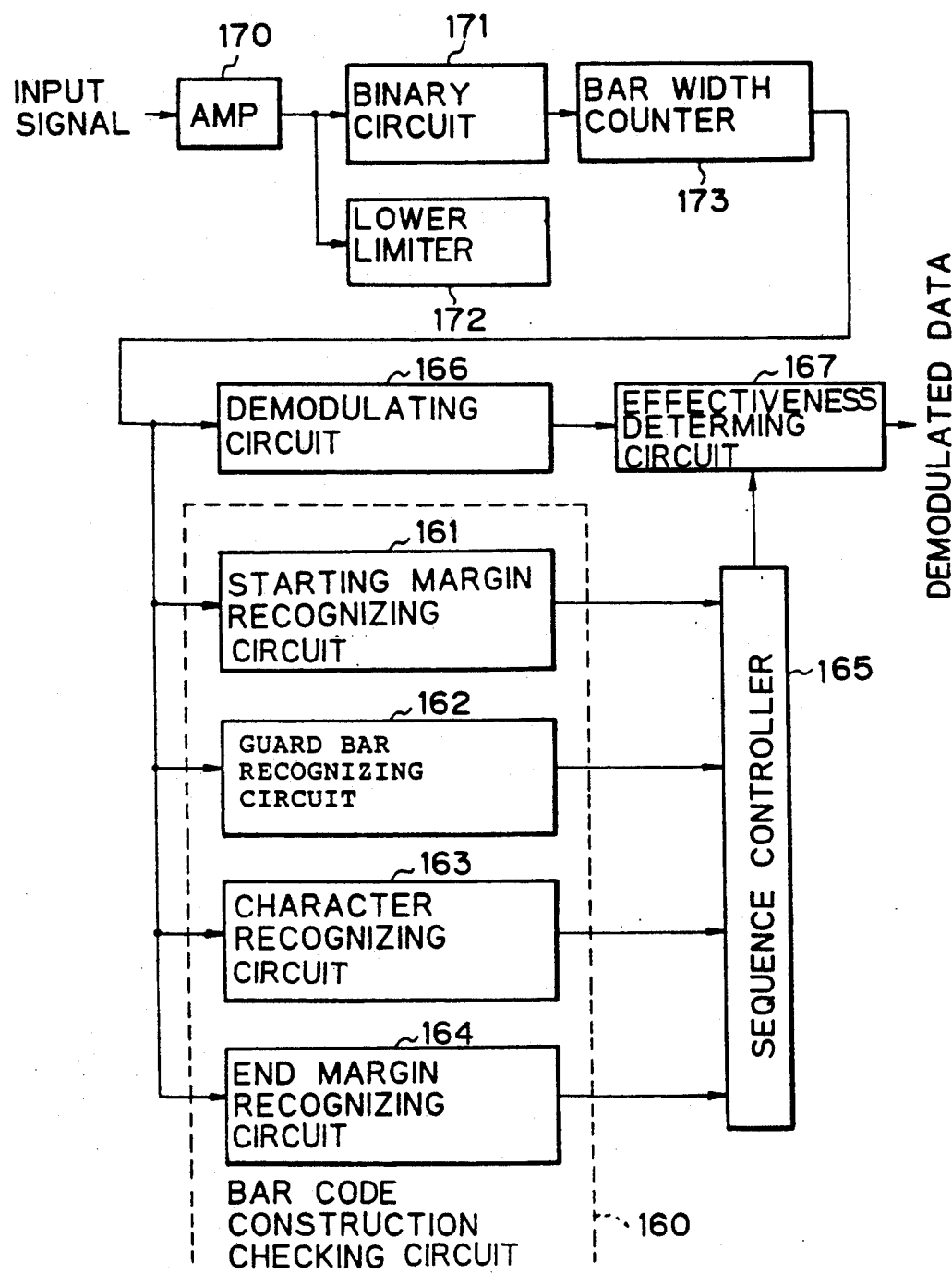
FIG. 7 is a block diagram of the prior art.

Namely, if the white margin produces noise, a bar width counter (refer to the counter 173 of FIG. 7) suspends counting of the width of the white bar and restarts the counting after the noise disappears. As a result, the width of the white bar will be shorter than a normal width.

According to the present invention, the amplitude increase detector 9 provides a signal after detecting a first black bar after the white margin. The present invention treats this signal the same as the signal provided by the start margin recognizing portion 13, and if other parts of the bar code are normal, the effectiveness determining circuit 11 validates the numerals decoded by the demodulator 10.

In this way, even if the white margin produces noise, the present invention uses a result of detection of the amplitude increase detector 9 to validate a signal produced by the black bar that follows the white margin. The present invention, therefore, can reduce a slice level and correctly read a bar code even with a weak input signal.

An embodiment of the present invention will be explained with reference to FIGS. 2A, 2B, and 3.

Figures 2, 2B:
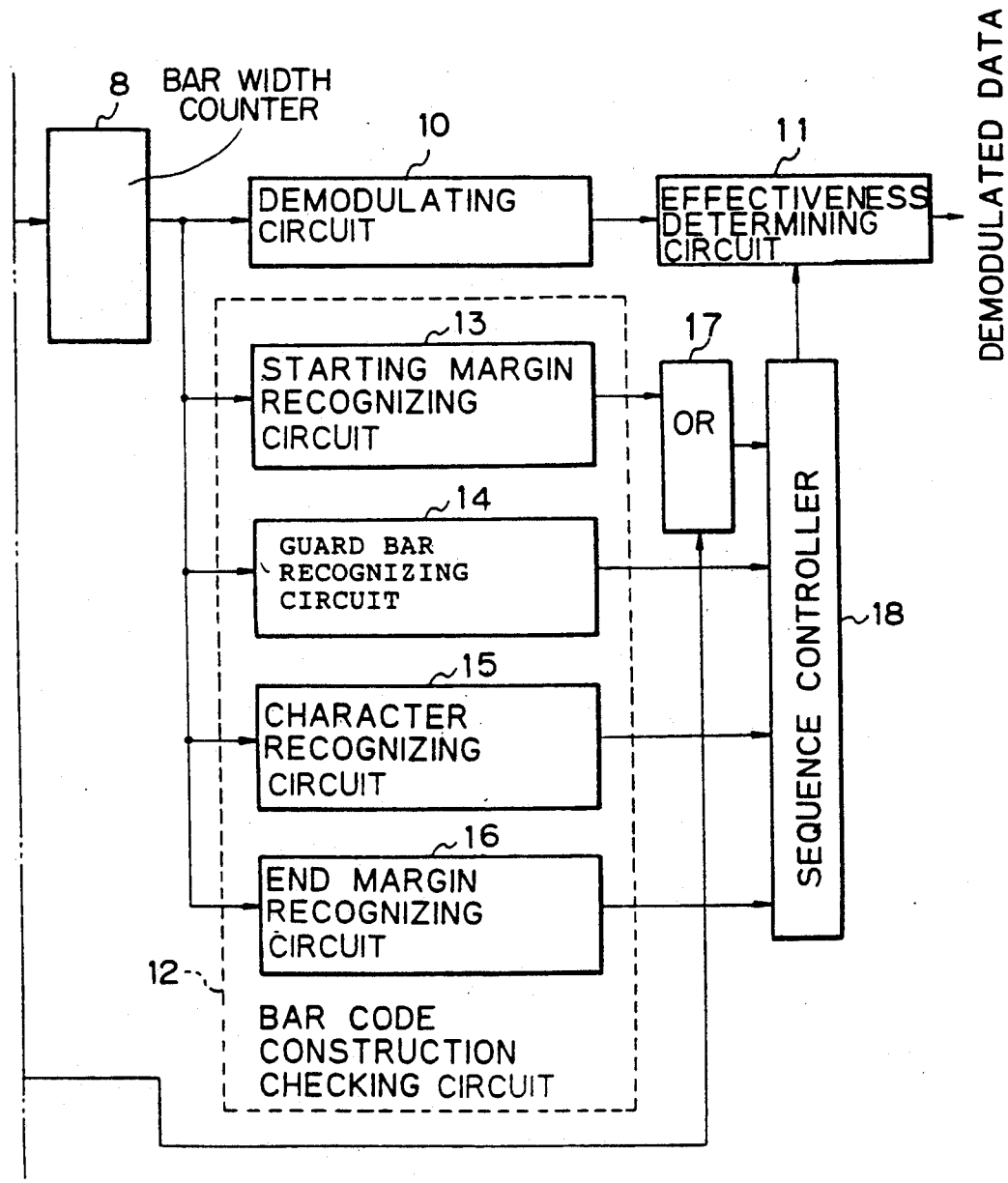
Figure 6:
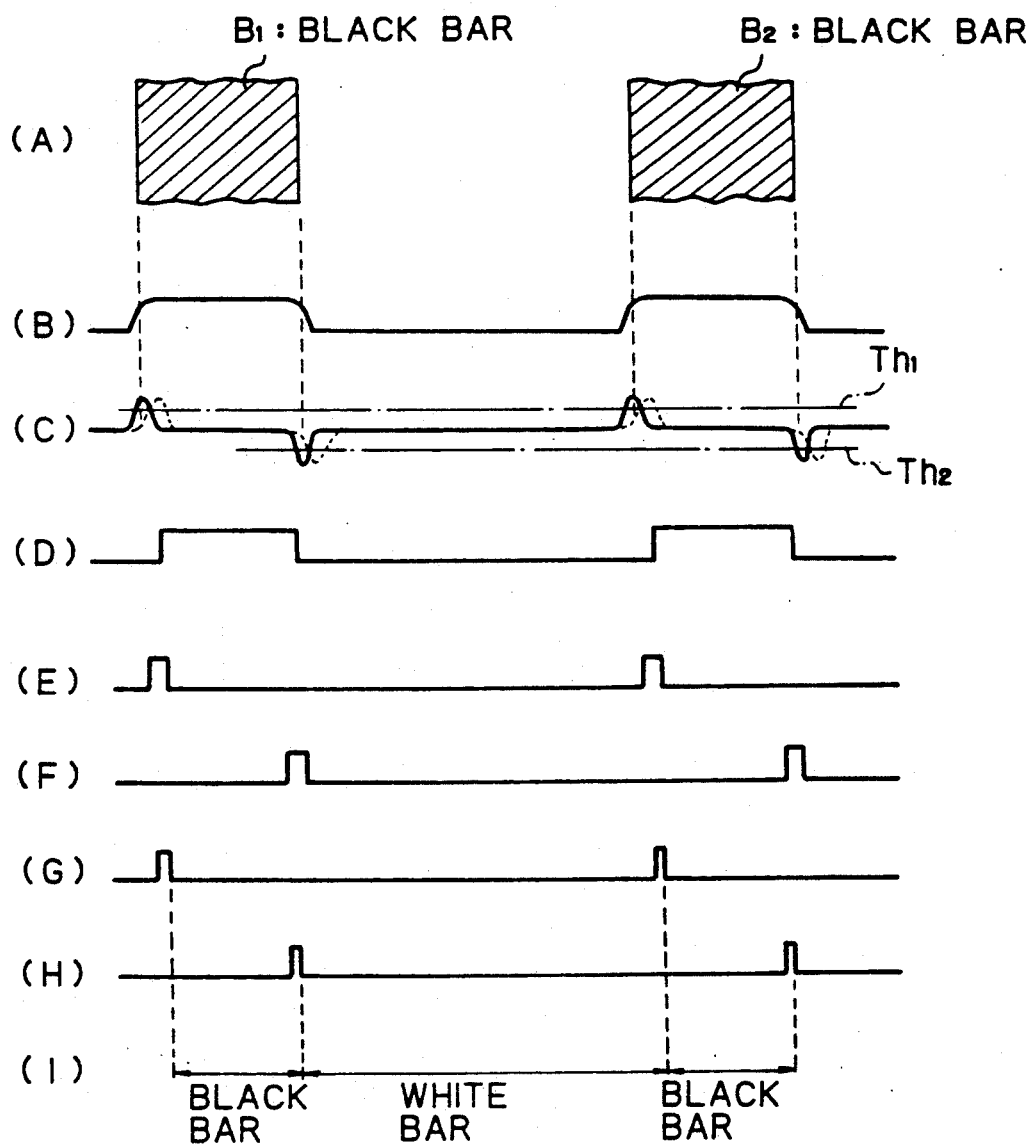
FIG. 6 is a chart for explaining an operation of the prior art of FIG. 5.

In FIG. 2A, numeral 1 denotes a bar code to be read, 2 a scanning portion for scanning the bar code 1 with a laser beam, 3 a collector for collecting reflected light from the bar code 1, 4 a detector having a photoelectric converter for converting an optical signal into an electric signal, 5 an amplifying portion incorporating an amplifier 5-1 shown in FIG. 2B-1, and 6 a binary circuit. The binary circuit 6 includes a lower limiter 7-1 and an amplitude increase detector 9. The lower limiter 7-1 corresponds to the lower limiter 172 of FIG. 7 but has a lower limit level smaller than that of the lower limiter 172, thereby widening a dynamic range to provide binary data even from a weak signal. In FIG. 2A, numeral 8 denotes a bar width counter corresponding to the bar width counter 173 of FIG. 7, 10 a demodulating portion corresponding to the demodulating portion 166 of FIG. 7, 11 an effectiveness determining section corresponding to the effectiveness determining circuit 167 of FIG. 7, and 12 a bar code construction checking portion corresponding to the bar code construction checking portion 160 of FIG. 7. The portion 12 includes a start margin recognizing portion 13, a guard bar recognizing portion 14, a character recognizing portion 15, and an end margin recognizing portion 16, which correspond to the start margin recognizing portion 161, guard bar recognizing portion 162, character recognizing portion 163, and end margin recognizing portion 164 of FIG. 7, respectively. Also in FIG. 2A, numeral 17 denotes an OR circuit, and 18 a sequence controller corresponding to the sequence controller 165 of FIG. 7. The sequence controller 18 comprises a processor and programs for operating the processor, and provides required functions.

The scanning portion 2 scans the bar code 1. The collector 3 collects reflected light from the scanned bar code 1, and the detector 4 converts the collected light into an electric signal. The amplifying portion 5 amplifies the signal, which is transferred to the binary circuit 6, lower limiter 7-1, and amplitude increase detector 9.

Supposing a white margin of the bar code 1 produces no noise, the binary circuit 6 produces a binary signal from the electric signal, and the bar width counter 8 measures the widths of white and black bars of the bar code 1 according to the binary signal. The demodulating portion 10 demodulates the widths into numerals. A format of the bar code 1 is checked by the start margin recognizing portion 13, guard bar recognizing portion 14, character recognizing portion 15, and end margin recognizing portion 16 of the bar code construction checking portion 12. If the bar code format is normal, the bar code construction checking portion 12 provides a check result, and the sequence controller 18 recognizes that the bar code format is normal. The sequence controller 18 then provides an effective signal to the effectiveness determining section 11. The section 11 then provides as demodulated data the numerals decoded by the demodulating portion 10.

If the white margin of the bar code 1 produces noise, the width of the white margin will be measured shorter than a prescribed width, so that the start margin recognizing portion 13 may not provide a start margin recognized signal, and the sequence controller 18 may not provide the effective signal.

According to the present invention, however, the amplitude increase detector 9 provides, upon detecting after the white margin an input signal whose level steeply increases above a predetermined level, a signal indicating that a first black bar was detected after the white margin. The signal from the detector 9 passes through the OR circuit 17 and reaches the sequence controller 18. The sequence controller 18 treats this signal to be the same as the signal provided by the start margin recognizing portion 13, and provides the effective signal to the effectiveness determining section 11, if other parts of the bar code are normal.

In this way, even if the white margin of the bar code 1 produces noise, it is possible to lower a slice level of the lower limiter 7-1 to read a bar code with a weak input signal.

FIG. 2B is a detailed view showing the binary circuit 6 of FIG. 2A and its periphery, and FIG. 3 shows an operation of the present invention.

In FIG. 2B, the same reference numerals as those of other drawings represent like parts.

Figure 5B:
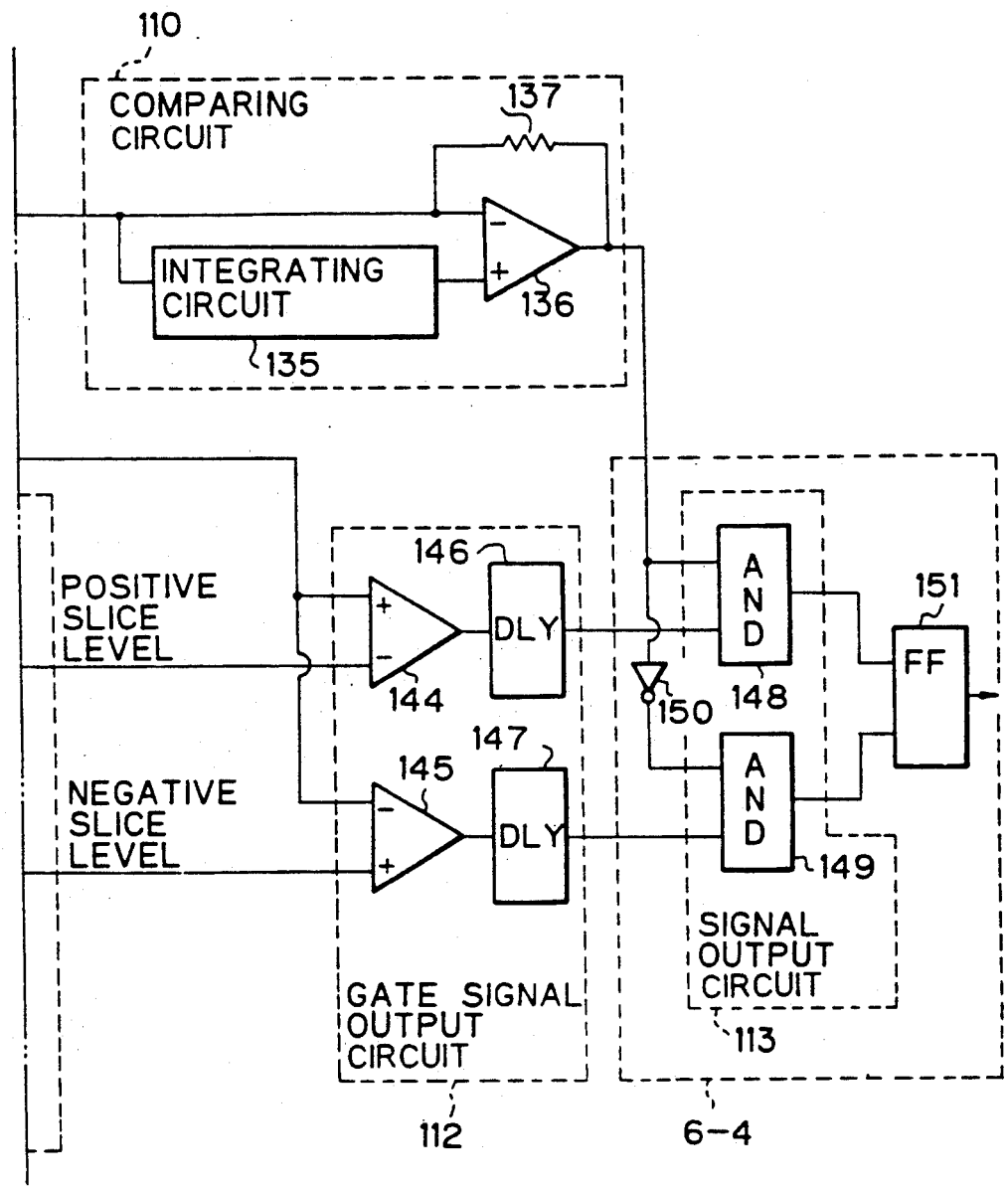

In FIG. 2B, numeral 5-1 denotes an amplifier, 5-2 a differential circuit corresponding to the differential circuit 132 of FIG. 5, 6-1 an integrating circuit, and 6-2 a comparator. The comparator 6-2 compares a differentiated signal from the differential circuit 5-2 with an integrated signal from the integrating circuit 6-1, and provides a differential peak signal PKS shown in FIG. 3(H) corresponding to the signal of FIG. 6(D). In FIG. 3(H), crossed lines indicate areas where noise occurs. In these areas, an output signal level fluctuates between ON and OFF states.

A DC level portion 6-3 has resistors 63a and 63b, a capacitor 63c, and an impedance converting amplifier 63d, and determines an intermediate point of an output voltage of the differential circuit 5-2. A gate portion 6-4 is similar to that of FIG. 5 and provides a binary signal BCD, which is transferred to the bar width counter 8 for measuring the widths of black and white bars of a bar code.

The lower limiter 7-1 comprises resistors 71a to 71c, a variable resistor 71d between a power source of $-12$ V and a ground, an addition amplifier 71e, and a diode 71f, and maintains a peak hold signal discharge waveform PKH above a predetermined lower limit value. With the lower limiter 7-1, the peak hold signal discharge waveform PKH provide by a peak holding portion 20 will never be below the lower limit level as shown in the left side of FIG. 3(C). The peak holding portion 20 comprises a diode 20a, a resistor 20b, and a capacitor 20c.

A differential circuit 9-1, a detection value setting portion 9-2, and a comparator 9-3 form the amplitude increase detector 9 that is characteristic to the first embodiment of the present invention. The detection value setting portion 9-2 has a variable resistor 92a disposed between a DC power source 92b and a ground. The differential circuit 9-1 differentiates the peak hold signal discharge waveform PKH provided by the lower limiter 7-1, and provides a differentiated PKH signal shown in FIG. 3(D). The comparator 9-3 compares the differentiated PKH signal with a threshold Th0 provided by the detection value setting portion 9-2. The threshold Th0 is a voltage of an armature 92c of the variable resistor 92a. If the differentiated PKH signal is greater than the threshold Th0, the comparator 9-3 provides, a detected signal P to the OR circuit 17 of FIG. 2A. A discharging portion 21 has a resistor 21a and discharges an output of the peak holding portion 20.

As shown in FIG. 3(D), when a first black bar b1 is detected, a change in the peak hold signal discharge waveform PKH reaches the maximum, and when a second black bar b2 is detected, a change in the peak hold signal discharge waveform PKH is smaller that the maximum. The reason of this is because the discharge waveform PKH is held in the peak holding portion 20 and because the discharge attenuation quantity of the discharging portion 21 is small in a short time period such as in a scanning period of an interval of the black bars.

The peak holding portion 20 holds a peak value of an output signal D of the differential circuit 5-2. A voltage dividing portion 22 has resistors 22a and 22b having resistance values of 100 K$\Omega$ and 50 K$\Omega$ respectively, and an amplifier 22c. The voltage dividing portion 22 divides an output of the lower limiter 7-1 into, for example, $-\frac{1}{2}$ to produce a white bar slice level WTh, which is supplied to an inverting portion 23. The inverting portion 23 produces a black bar slice level BTh. The voltage dividing ratio may be optional according to requirements. The inverting portion 23 has resistors 23a and 23b each having a resistance value of 100 K$\Omega$, and an amplifier 23c. The inverting portion 23 provides an output voltage of $-1$ time of a voltage supplied to the amplifier 23c. The black bar slice level BTh and white bar slice level WTh are provided to comparators 24 and 25, respectively, and compared with the output signal D of the differential circuit 5-2. The comparators 24 and 25 then provide gate signals BLK and WHT, respectively, to the gate portion 6-4.

FIG. 3(C) shows the black bar slice level BTh and white bar slice level WTh with dash-and-dot lines. FIG. 3(F) shows the gate signal BLK provided by the comparator 24, and FIG. 3(G) shows the gate signal WHT provided by the comparator 25.

According to the differential peak signal PKS provided by the comparator 6-2 and the gate signals BLK and WHT, the gate portion 6-4 provides a black edge signal BEG shown in FIG. 3(I) and a white edge signal WEG shown in FIG. 3(J). Based on these signals, a binary signal BCD of FIG. 3(K) is formed.

In the example of FIG. 3, the white margin before the black bar b1 produces noise N due to, for example, irregularities on the surface of a sheet where the bar code is printed. The noise N produces noise N' in the binary signal BCD. The start margin recognizing portion 13 of FIG. 1, therefore, does not provide a white margin recognized signal. At the end of the white margin, i.e., at a leading edge of the black bar b1, the comparator 9-3 of the amplitude increase detector 9 provides the signal P of FIG. 3(E) to the OR circuit 17, which provides the signal P to the sequence controller 18. The detection signal P indicates that a signal level has steeply increased. According to the signal P, the sequence controller 18 of FIG. 2A judges that the start margin recognizing portion 13 has provided an output, and provides an effective signal, if other parts of the bar code are normal. As a result, even with such noise, the effectiveness determining portion 11 provides demodulated data, i.e., numerals decoded by the demodulating portion 10.

Figure 4A:
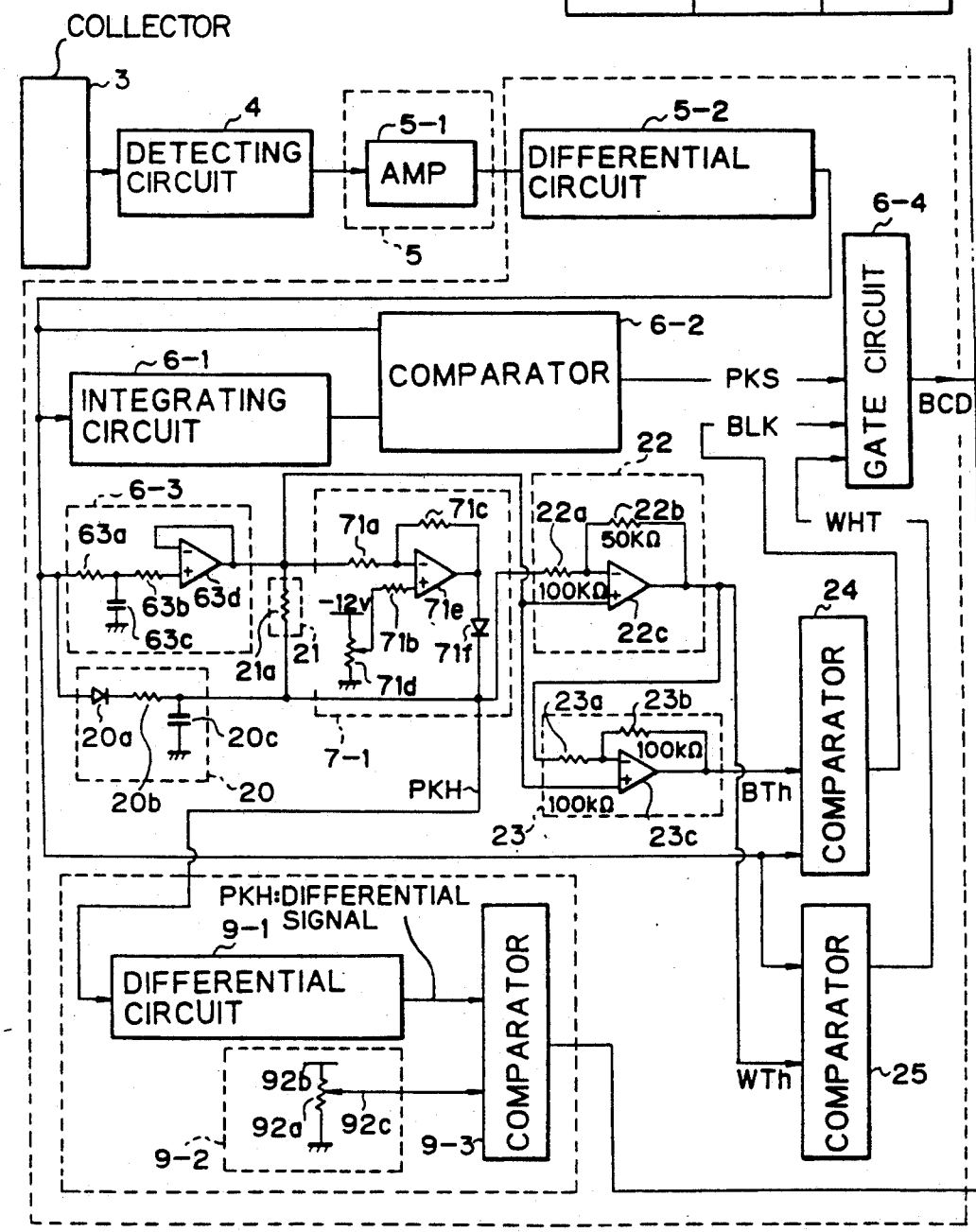
FIGS. 4A, 4B and 4C are block diagrams of the essential part of a second embodiment of the present invention.
Figure 4B:
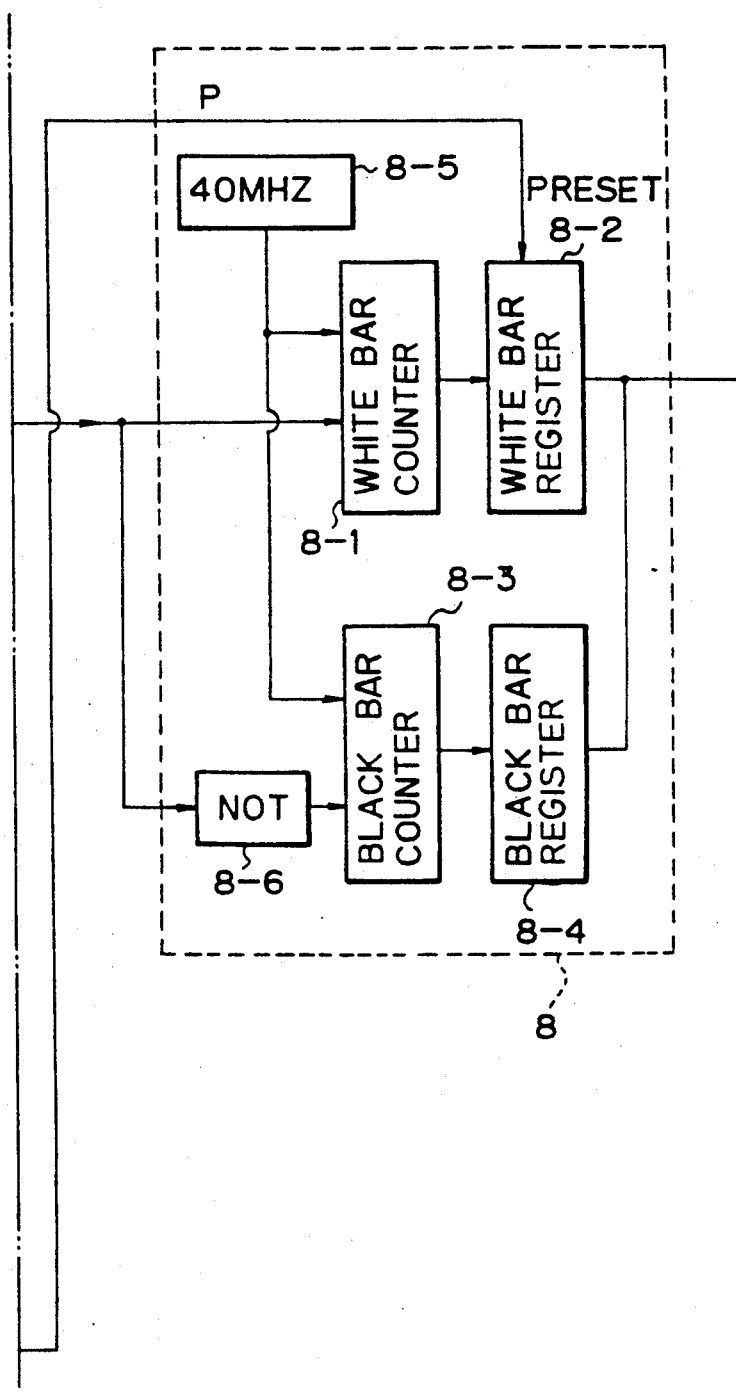
Figure 4C:
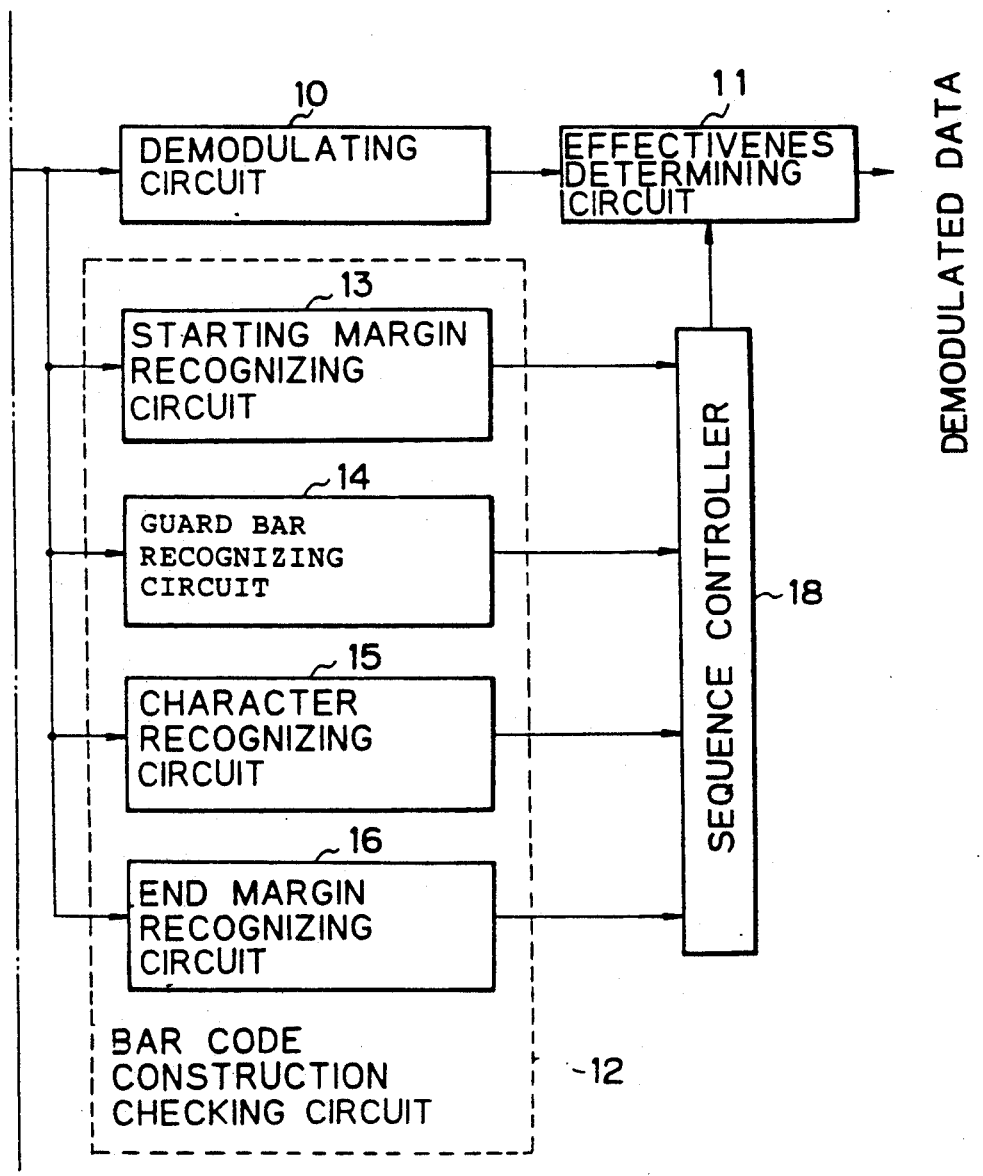

FIG. 4 shows a second embodiment of the present invention. Instead of the bar width counter 8 of FIG. 2A, the embodiment of FIG. 4 employs a bar width counter 8 having a margin width correcting circuit. Except for the OR circuit 17, the arrangement of FIG. 4 is the same as that of FIGS. 2A and 2B. In FIG. 4 numeral 8-1 denotes a known white bar counter for measuring the width of a white bar, and 8-2 a white bar register that is characteristic of the second embodiment. Numeral 8-3 denotes a known black bar counter for measuring the width of a black bar, 8-4 a black bar register for storing a count of the black bar counter 8-3, 8-5 a clock oscillator oscillating at, for example, 40 MHz for driving the white bar counter 8-1 and black bar counter 8-3, and 8-6 an inverter for inverting the binary signal BCD to provide an enabling signal for the black bar counter 8-3. An enabling signal for the white bar counter 8-1 is the binary signal BCD.

In FIG. 4, the white bar register 8-2 is set with a count of the white bar counter 8-1 under a normal state. If the comparator 9-3 of FIG. 2B provides the detection signal, P of FIG. 3(E), the white bar register 8-2 is preset to, for example, all "1"s. Namely, the count of the counter 8-1 is rewritten with a maximum value, and it is judged that, even if noise occurs, there is a white bar of predetermined width.

One concrete example will be explained. It is supposed that the scanning of a normal start margin provides a count of 3000 in the white bar register 8-2. If noise occurs during the scanning, the counting operation suspends, and restarts after the noise disappears. It is supposed that the white bar register 8-2 is showing a count of 300 when the next black bar, i.e., a guard bar has been detected. The conventional technique may admit this value as one that does not represent the start margin of a bar code. According to the embodiment of the present invention, however, the detected signal P is applied, when the guard bar is detected, to the white bar register 8-2 that is showing 300, thereby rewriting the count to 3000 and changing the status as if there is a normal start margin.

In this way, the signal P is provided when the first black bar b1 is detected after the white margin of the bar, code, and the white bar register 8-2 is preset to all "1"s of a predetermined value. Thereafter, the start margin recognizing portion 13 of FIG. 2A reads the white bar register 8-2 and judges that there is a white margin having a predetermined width and provides a recognized signal to the sequence controller 18. The sequence controller 18 then recognizes that there is the start white margin having the predetermined width.

The embodiment of FIG. 4 does not require the OR circuit 17 of FIG. 2A, and an output of the start margin recognizing portion 13 is directly transferred to the sequence controller 18.

In this way, the present invention utilizes the fact that there is a large difference between the amplitude of noise produced by irregularities on a white margin of a bar code and the amplitude of a signal produced by a start portion (guard bar) of the bar code, and recognizes that the guard bar after the white margin of the bar code is being scanned if the amplitude of a signal steeply changes.

By detecting the steep change in the signal amplitude, it is possible to find the start of the bar code, even if very small irregularities on the white margin of the bar code produce noise.

As a result, the present invention can set a lower limit value of a signal amplitude lower than that of the conventional technique, thereby securing a larger dynamic range.

The signal amplitude may steeply increase due to regular reflection from a scanned medium or disturbing light such as lighting and sunlight. It is possible to discriminate a signal produced by such disturbance from a bar code signal according to a signal pattern following the disturbance signal, so that no malfunction may occur due to the disturbance.

The present invention can correctly recognize the start of a bar code even with a small lower limit value, and with the small lower limit value, widen a dynamic range, thereby improving the reading performance of a bar code reader.

What is claimed is:

1. A bar code reading system comprising:
   a scanning portion;
   a collector for collecting light reflected by a bar code;
   means for extracting an analog signal from the collected light;
   a binary circuit, coupled to said extracting means, or producing, as an output, a binary signal according to the analog signal extracted from the collected light;
   a bar width counter, coupled to said binary circuit, for computing the widths of bars of the bar code according to an output of said binary circuit;
   a demodulating portion, coupled to said bar width counter, for providing data according to the widths computed by said bar width counter;
   a bar code construction checking portion, coupled to said bar width counter, for checking the construction of predetermined parts of the bar code according to the widths computed by said bar width counter and provided with a start margin recognizing circuit for recognizing an existence of a start margin of said bar code;
   a sequence controller, coupled to said bar code construction checking portion, for controlling said bar code construction checking portion, said sequence controller judging that the data provided by said demodulating portion are effective only when the bar code is judged to have a predetermined construction, and allowing the data to be supplied as an output; and
   an amplitude increase detecting means for detecting when the amplitude of the analog signal steeply changes and providing a detected signal;
   said sequence controller ignoring noise produced by at least a start margin of the bar code on the basis of information obtained by output of said start margin recognizing circuit when said amplitude increase detecting means provides the detected signal, and carrying out its controlling task as if the start margin of the bar code is normal.

2. A bar code reading system as set forth in claim 1, wherein, when said bar code construction checking portion detects that at least the start margin has produced noise and when said amplitude increase detecting means detects that the amplitude of an analog signal corresponding to a guard bar disposed after the start margin of the bar code has steeply changed to exceed a predetermined value, said sequence controller ignores the noise produced by the start margin and judges that the start margin is normal.

3. A bar code reading apparatus having:
a scanning portion;
a collector for collecting light reflected by a bar code;
means for extracting an analog signal from the collected light;
a binary circuit, coupled to said extracting means, or producing, as an output, a binary signal according to the analog signal extracted from the collected light;
a bar width counter, coupled to said binary circuit, for computing the widths of bars of the bar code according to the output of said binary circuit;
a demodulating portion, coupled to said bar width counter, for providing data according to the widths computed by said bar width counter;
a bar code construction checking portion, coupled to said bar width counter, for checking the construction of predetermined parts of the bar code according to the widths coupled by said bar width counter; and
a sequence controller, coupled to said bar code construction checking portion, for controlling said bar code construction checking portion, said sequence controller judging that the data provided by said demodulating portion are effective only when the bar code is judged to have a predetermined construction, and allowing the data to be supplied as an output, wherein:
said bar code construction checking portion at least comprises:
a start margin recognizing portion, coupled to said bar width counter, for providing an output;
a guard bar recognizing portion, coupled to said bar width counter, for providing an output to said sequence controller; and
a character recognizing portion, coupled to said bar width counter, for providing an output to said sequence controller;
amplitude increase detecting means for detecting an amplitude increase and for providing an output;
an OR circuit having a first input connected to the output of said start margin recognizing portion, having a second input connected to the output of said amplitude increase detecting means, and having an output connected to said sequence controller.

4. A bar code reading system as set forth in claim 1, wherein said bar width counter includes:
a white bar counter coupled to said binary circuit;
a white bar register coupled to said white bar counter;
a black bar counter coupled to said binary circuit; and
a black bar register coupled to said black bar counter, said white and black bar counters accumulating their counts in said white and black bar registers, respectively, according to information provided by said binary circuit, wherein the register value of said white bar register is set at a preset value corresponding to a normal width of said start margin of said bar code when the output signal is output from said amplitude increase detecting means, to thereby make the output signal output from said white bar counter ineffective.

5. A bar code reading system as set forth in claim 4, wherein, when the count stored in said white bar register is smaller than a count stored in said white bar there is a normal start margin in the bar code, due to noise produced by at least the start margin, and when the amplitude of an analog signal corresponding to a guard bar that follows just after the start margin of the bar code steeply changes to exceed a predetermined value, the count stored in said white bar register is rewritten, according to a detected signal provided by said amplitude increase detecting means, to one equal to or above a count that is obtainable when there is a normal start margin in the bar code.

6. A bar code reading apparatus having:
a scanning portion;
a collector for collecting light reflected by a bar code;
means for extracting an analog signal from the collected light;
a binary circuit, coupled to said extracting means, or producing, as an output, a binary signal according to the analog signal extracted from the collected light;
a bar width counter, coupled to said binary circuit, for computing the widths of bars of the bar code according to the output of said binary circuit;
a demodulating portion, coupled to said bar width counter, for providing data according to the widths computed by said bar width counter;
a bar code construction checking portion, coupled to said bar width counter, for checking the construction of predetermined parts of the bar code according to the widths coupled by said bar width counter;
amplitude increase detecting means for detecting an increase in amplitude and providing an output; and
a sequence controller, coupled to said bar code construction checking portion, for controlling said bar code construction checking portion, said sequence controller judging that the data provided by said demodulating portion are effective only when the bar code is judged to have a predetermined construction, and allowing the data to be supplied as an output wherein:
said bar width counter comprises:
a white bar counter coupled to said binary circuit;
a white bar register coupled to said white bar counter and having a preset terminal;
a black bar counter coupled to said binary circuit; and
a black bar register coupled to said black bar counter, the output of said amplitude increase detecting means being connected to the preset terminal of said white bar register so that the count of said white bar counter may be updated to a predetermined value according to output of said amplitude increase detecting means.

7. A bar code reading system comprising:
first means for scanning a bar code and for producing an output signal corresponding to the scanned bar code;
second means for detecting when the amplitude of the output signal increases at a rate greater than a predetermined rate and for providing a detection signal;
third means for receiving the output signal and for providing output data corresponding to the widths of the bars of the scanned bar code;

fourth means for controlling the output of the output data and for determining that the output data provided by said third means are effective even when a width of a start margin of said bar code corresponding to the output data, is less than a predetermined width, on the basis of information obtained by outputs of said third means and said second means, which are output when a steep increment in the amplitude is detected, said fourth means including means for filtering noise produced by the start margin of the scanned bar code when the detection signal is generated by said second means.

8. A bar code reading method, comprising the steps of:

(a) scanning a bar code and producing an output signal corresponding to the scanned bar code;
(b) detecting when the amplitude of the output signal increases at a rate greater than a predetermined rate, and providing a detection signal;
(c) converting the output signal into output data corresponding to the widths of the bars of the scanned bar code;
(d) determining whether the scanned bar code has a predetermined configuration; and
(e) filtering noise produced by the predetermined configuration of the scanned bar code when the detection signal is generated in said step (b).

* * * * *

UNITED STATES PATENT AND TRADEMARK OFFICE
CERTIFICATE OF CORRECTION

PATENT NO. : 5,142,130
DATED : AUGUST 25, 1992
INVENTOR(S) : SHINICHI SATO

It is certified that error appears in the above-identified patent and that said Letters Patent is hereby corrected as shown below:

Col. 4, line 18, "produce" should be --produces--;
       line 68, "provides" should be --provide--.

Col. 9, line 47, "bar, code," should be --bar code,--.

Col. 10, line 26, "or" should be --for--.

Col. 11, line 9, "or" should be --for--;
       line 22, "coupled" should be --computed--.

Col. 12, line 3, "stored in said white bar" should be --that is obtainable when--;
       line 20, "or" should be -for--;
       line 56, "to output" should be --to the output--.

Signed and Sealed this

Fourteenth Day of September, 1993

Attest:

BRUCE LEHMAN

*Attesting Officer*     *Commissioner of Patents and Trademarks*